United States Patent
K et al.

(10) Patent No.: US 12,113,705 B2
(45) Date of Patent: Oct. 8, 2024

(54) CONTROLLER WATCH PORT FOR ROBUST SOFTWARE DEFINED NETWORKING (SDN) SYSTEM OPERATION

(71) Applicant: TELEFONAKTIEBOLAGET LM ERICSSON (PUBL), Stockholm (SE)

(72) Inventors: Faseela K, Karnataka (IN); Vyshakh Krishnan C H, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 17/633,590

(22) PCT Filed: Aug. 9, 2019

(86) PCT No.: PCT/IN2019/050587
§ 371 (c)(1),
(2) Date: Feb. 8, 2022

(87) PCT Pub. No.: WO2021/028931
PCT Pub. Date: Feb. 18, 2021

(65) Prior Publication Data
US 2022/0311703 A1    Sep. 29, 2022

(51) Int. Cl.
*H04L 45/00* (2022.01)
*H04L 41/0803* (2022.01)
(Continued)

(52) U.S. Cl.
CPC .......... *H04L 45/38* (2013.01); *H04L 41/0803* (2013.01); *H04L 41/0895* (2022.05);
(Continued)

(58) Field of Classification Search
CPC . H04L 45/38; H04L 41/0803; H04L 41/0806; H04L 41/0895; H04L 41/40;
(Continued)

(56) References Cited

U.S. PATENT DOCUMENTS

| 10,298,694 | B1 * | 5/2019 | Tagore | H04L 63/0209 |
| 2015/0023147 | A1 * | 1/2015 | Lee | H04L 45/28 370/216 |

(Continued)

FOREIGN PATENT DOCUMENTS

| CN | 104580025 A | * | 4/2015 | ........... H04L 67/141 |
| CN | 107547249 A | * | 1/2018 | |

(Continued)

*Primary Examiner* — Mohamed A Kamara

(57) ABSTRACT

A method by a first controller in a software defined networking (SDN) network for programming a switch in the SDN network to use a controller port as a watch port. The method includes generating an instruction for the switch to create a first group entry for a first group in a packet processing pipeline of the switch, where the first group entry includes a first bucket that specifies a first controller port as a watch port and an action for the switch to forward packets to the first controller via the first controller port, where the first controller port being specified as the watch port in the first bucket indicates that execution of the action specified by the first bucket is to be contingent upon a liveness of the first controller port and sending the instruction to the switch to cause the switch to create the first group entry.

10 Claims, 10 Drawing Sheets

(51) Int. Cl.
*H04L 41/0895* (2022.01)
*H04L 43/0817* (2022.01)
*H04L 45/64* (2022.01)
*H04L 45/76* (2022.01)
*H04L 47/193* (2022.01)

(52) U.S. Cl.
CPC .......... *H04L 43/0817* (2013.01); *H04L 45/64* (2013.01); *H04L 45/76* (2022.05); *H04L 47/193* (2013.01)

(58) Field of Classification Search
CPC ..... H04L 43/0817; H04L 45/64; H04L 45/76; H04L 47/193; H04L 43/10; H04L 45/026; H04L 45/28; H04L 45/655; H04L 45/70
See application file for complete search history.

(56) References Cited

U.S. PATENT DOCUMENTS

| | | | |
|---|---|---|---|
| 2018/0183704 A1* | 6/2018 | Cevher | H04L 45/745 |
| 2019/0273677 A1* | 9/2019 | Smith | H04L 45/22 |
| 2020/0351334 A1* | 11/2020 | Bisht | H04L 41/0895 |

FOREIGN PATENT DOCUMENTS

| | | |
|---|---|---|
| EP | 3332511 | 6/2018 |
| WO | 2017021889 A1 | 2/2017 |
| WO | 2018150223 A1 | 8/2018 |
| WO | 2018205982 A1 | 11/2018 |
| WO | 2019138415 A1 | 7/2019 |

* cited by examiner

GENERATE, BY THE FIRST CONTROLLER, AN INSTRUCTION FOR THE SWITCH TO CREATE A FIRST GROUP ENTRY FOR A FIRST GROUP IN A PACKET PROCESSING PIPELINE OF THE SWITCH, WHERE THE FIRST GROUP ENTRY INCLUDES A FIRST BUCKET THAT SPECIFIES A FIRST CONTROLLER PORT AS A WATCH PORT AND AN ACTION FOR THE SWITCH TO FORWARD PACKETS TO THE FIRST CONTROLLER VIA THE FIRST CONTROLLER PORT, WHERE THE FIRST CONTROLLER PORT IS A PORT THAT IS ASSOCIATED WITH A CONTROL CHANNEL BETWEEN THE SWITCH AND THE FIRST CONTROLLER, WHERE THE FIRST CONTROLLER BEING SPECIFIED AS THE WATCH PORT IN THE FIRST BUCKET INDICATES THAT EXECUTION OF THE ACTION SPECIFIED BY THE FIRST BUCKET IS TO BE CONTINGENT UPON A LIVENESS OF THE FIRST CONTROLLER PORT (610)

SECURTY ANALYSIS USE CASE:

THE FIRST GROUP ENTRY FURTHER INCLUDES A SECOND BUCKET THAT SPECIFIES THE FIRST CONTROLLER PORT AS A WATCH PORT AND AN ACTION FOR THE SWITCH TO FORWARD PACKETS VIA A SPECIFIED PORT, WHERE THE FIRST GROUP IS OF A REPLICATION GROUP TYPE (615A)

MULTIPLE CONTROLLER USE CASE:

THE FIRST GROUP ENTRY FURTHER INCLUDES A SECOND BUCKET THAT SPECIFEIS A SECOND CONTROLLER PORT AS A WATCH PORT AND AN ACTION FOR THE SWITCH TO FORWARD PACKETS TO A SECOND CONTROLLER THAT IS DIFFERENT FROM THE FIRST CONTROLLER VIA THE SECOND CONTROLLER PORT, WHERE THE SECOND CONTROLLER PORT IS A PORT THAT IS ASSOCIATED WITH A CONTROL CHANNEL BETWEEN THE SWITCH AND THE SECOND CONTROLLER, WHERE THE FIRST GROUP IS OF A SELECT GROUP TYPE OR A FAST FAILOVER GROUP TYPE (615B)

ARP USE CASE:

THE FIRST GROUP ENTRY FURTHER INCLUDES A SECOND BUCKET THAT SPECIFIES A SECOND GROUP AS A WATCH GROUP AND AN ACTION FOR THE SWITCH TO PROCESS PACKETS USING THE SECOND GROUP, WHERE THE FIRST GROUP IS OF A FAST FAILOVER GROUP TYPE, WHERE THE SECOND GROUP IS OF A REPLICATION GROUP TYPE (615C)

REDIRECTION USE CASE:

THE FIRST GROUP ENTRY FURTHER INCLUDES A SECOND BUCKET THAT SPECIFIES A PORT AS A WATCH PORT AND AN ACTION FOR THE SWITCH TO FORWARD PACKETS TO THE FIRST CONTROLLER VIA THE PORT, WHERE THE PORT IS ASSOCIATED WITH AN IN-BAND COMMUNICATION CHANNEL BETWEEN THE SWITCH AND THE FIRST CONTROLLER, WHERE THE FIRST GROUP IS OF A FAST FAILOVER GROUP TYPE (615D)

SEND THE INSTRUCTION TO THE SWITCH TO CAUSE THE SWITCH TO CREATE THE FIRST GROUP ENTRY IN A PACKET PROCESSING PIPELINE OF THE SWITCH (620)

Figure 6

RECEIVE, FROM THE FIRST CONTROLLER, AN INSTRUCTION FOR THE SWITCH TO CREATE A FIRST GROUP ENTRY FOR A FIRST GROUP IN A PACKET PROCESSING PIPELINE OF THE SWITCH, WHERE THE FIRST GROUP ENTRY INCLUDES A FIRST BUCKET THAT SPECIFIES A FIRST CONTROLLER PORT AS A WATCH PORT AND AN ACTION FOR THE SWITCH TO FORWARD PACKETS TO THE FIRST CONTROLLER VIA THE FIRST CONTROLLER PORT, WHERE THE FIRST CONTROLLER PORT IS A PORT THAT IS ASSOCIATED WITH A CONTROL CHANNEL BETWEEN THE SWITCH AND THE FIRST CONTROLLER, WHERE THE FIRST CONTROLLER BEING SPECIFIED AS THE WATCH PORT IN THE FIRST BUCKET INDICATES THAT EXECUTION OF THE ACTION SPECIFIED BY THE FIRST BUCKET IS TO BE CONTINGENT UPON A LIVENESS OF THE FIRST CONTROLLER PORT (710)

SECURTY ANALYSIS USE CASE:

THE FIRST GROUP ENTRY FURTHER INCLUDES A SECOND BUCKET THAT SPECIFIES THE FIRST CONTROLLER PORT AS A WATCH PORT AND AN ACTION FOR THE SWITCH TO FORWARD PACKETS VIA A SPECIFIED PORT, WHERE THE FIRST GROUP IS OF A REPLICATION GROUP TYPE (715A)

MULTIPLE CONTROLLER USE CASE:

THE FIRST GROUP ENTRY FURTHER INCLUDES A SECOND BUCKET THAT SPECIFEIS A SECOND CONTROLLER PORT AS A WATCH PORT AND AN ACTION FOR THE SWITCH TO FORWARD PACKETS TO A SECOND CONTROLLER THAT IS DIFFERENT FROM THE FIRST CONTROLLER VIA THE SECOND CONTROLLER PORT, WHERE THE SECOND CONTROLLER PORT IS A PORT THAT IS ASSOCIATED WITH A CONTROL CHANNEL BETWEEN THE SWITCH AND THE SECOND CONTROLLER, WHERE THE FIRST GROUP IS OF A SELECT GROUP TYPE OR A FAST FAILOVER GROUP TYPE (715B)

ARP USE CASE:

THE FIRST GROUP ENTRY FURTHER INCLUDES A SECOND BUCKET THAT SPECIFIES A SECOND GROUP AS A WATCH GROUP AND AN ACTION FOR THE SWITCH TO PROCESS PACKETS USING THE SECOND GROUP, WHERE THE FIRST GROUP IS OF A FAST FAILOVER GROUP TYPE, WHERE THE SECOND GROUP IS OF A REPLICATION GROUP TYPE (715C)

REDIRECTION USE CASE:

THE FIRST GROUP ENTRY FURTHER INCLUDES A SECOND BUCKET THAT SPECIFIES A PORT AS A WATCH PORT AND AN ACTION FOR THE SWITCH TO FORWARD PACKETS TO THE FIRST CONTROLLER VIA THE PORT, WHERE THE PORT IS ASSOCIATED WITH AN IN-BAND COMMUNICATION CHANNEL BETWEEN THE SWITCH AND THE FIRST CONTROLLER, WHERE THE FIRST GROUP IS OF A FAST FAILOVER GROUP TYPE (715D)

CREATE THE FIRST GROUP ENTRY IN THE PACKET PROCESSING PIPELINE OF THE SWITCH ACCORDING TO THE INSTRUCTION RECEIVED FROM THE FIRST CONTROLLER (720)

MONITOR THE LIVELIENESS OF THE FIRST CONTROLLER PORT (AND ANY OTHER CONTROLLER PORTS THAT ARE SPECIFIED AS WATCH PORTS) (730)

PROCESS PACKETS DIRECTED TO THE FIRST GROUP USING THE FIRST GROUP (740)

Figure 7

CONTROLLER WATCH PORT FOR ROBUST SOFTWARE DEFINED NETWORKING (SDN) SYSTEM OPERATION

TECHNICAL FIELD

Embodiments disclosed herein relate to the field of computer networks, and more specifically to using a controller port as a watch port to provide robust operation in a software defined networking (SDN) network.

BACKGROUND

Software defined networking (SDN) is an approach to computer networking that employs a split architecture network in which the forwarding plane (also referred to as the data plane) is decoupled from the control plane. The use of a split architecture network simplifies the network devices (e.g., switches) implementing the data plane by shifting the intelligence of the network into one or more controllers that oversee the switches. SDN facilitates rapid and open innovation at the network layer by providing a programmable network infrastructure. A SDN network typically includes one or more controllers that oversee multiple switches. Controllers can program the switches to implement the desired forwarding behavior in the SDN network.

OpenFlow is a southbound communications protocol that enables a SDN controller to program the forwarding behavior of switches in a SDN network. An OpenFlow switch includes a packet processing pipeline that includes one or more flow tables. Each flow table includes one or more flow entries, where each flow entry specifies a match condition and a set of instructions to execute when an incoming packet matches the match condition. The set of instructions may include instructions for the switch to perform various operations on the packet including, but not limited to, forwarding the packet to a specified port, modifying certain bits in the packet header, encapsulating the packet, dropping the packet, and directing the packet to another flow table.

The OpenFlow specification (e.g., OpenFlow specification v. 1.5.1) describes the notion of groups. Groups are implemented in OpenFlow using a group table in the packet processing pipeline of the switch. The group table may include one or more group entries, where each group entry represents/defines a group. Each group entry may include zero or more buckets. A bucket typically specifies actions to modify the packet and an output action that forwards the packet to a specified port. If the switch supports group chaining, a bucket may specify a group action which directs the packet to another group for group processing. A group entry with no buckets effectively drops the packet. Flow entries may direct packets to a group by invoking a group action specifying the group. The ability for flow entries to direct packets to a group for group processing enables OpenFlow to represent additional methods of packet processing/forwarding.

The OpenFlow specification defines several group types. These group types include an "indirect" group type, an "all" group type (also referred to as a "replication" group type), a "select" group type, and a "fast failover" group type. The indirect group type only allows a single bucket and executes that one defined bucket in the group. The all group type executes all buckets in the group. This type of group is typically used for multicast or broadcast forwarding. The packet is effectively cloned for each bucket; one packet is processed for each bucket in the group. The select group type executes one selected bucket in the group. The bucket to execute is selected based on a switch-computed selection algorithm (e.g., hash on some user-configured tuple or simple round robin). When a port specified in a bucket in this type of group goes down, the switch may restrict bucket selection to the remaining set (those with forwarding actions to live ports) instead of dropping packets destined to that port. This behavior may reduce the disruption of a downed link or switch. The fast failover group type executes the first live bucket. Each bucket is associated with a specific port and/or group that controls the liveness of that bucket (such port/group is referred to as a watch port/group for the bucket). The buckets are evaluated in the order defined by the group, and the first bucket which is associated with a live port/group is selected and executed.

A group bucket may specify a watch port/group that indicates the port/group whose liveness controls whether the bucket is a candidate for execution. If the watch port is specified as OFPP_ANY, then this indicates no port is being watched. If the watch group is specified as OFPG_ANY, then this indicates no group is being watched.

Fast failover group support requires liveness monitoring to determine the specific bucket to execute. Other group types are not required to implement liveness monitoring but may optionally implement it.

In OpenFlow, a port is considered live if it exists in the datapath and has the OFPPS_LIVE flag set in its port state. Port liveness may be managed by code outside of the OpenFlow portion of a switch, defined outside of the OpenFlow specification, such as Spanning Tree or a KeepAlive mechanism. The port must not be considered live if one of the port liveness mechanisms of the switch enabled on that OpenFlow port considers the port not live, or if the port config bit OFPPC_PORT_DOWN indicates the port is down, or if the port state bit OFPPS_LINK_DOWN indicates the link is down.

A bucket is considered live if either watch_port is not OFPP_ANY and the port watched is live, or if watch_group is not OFPG_ANY and the group watched is live. In other words, the bucket is considered not live if watch_port is OFPP_ANY or the port watched is not live, and if watch_group is OFPG_ANY or the group watched is not live. A group is considered live if at least one of its buckets is live.

Currently, the OpenFlow specification does not support liveness flags for reserved ports such as the CONTROLLER reserved port. As such, the CONTROLLER reserved port cannot be configured as a watch port for a bucket.

SUMMARY

A method by one or more network devices implementing a first controller in a software defined networking (SDN) network for programming a switch in the SDN network to use a controller port as a watch port. The method includes generating an instruction for the switch to create a first group entry for a first group in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller port being specified as the watch port in the first bucket indicates that execution of the action specified by the first bucket is to be contingent upon a liveness of the first controller port and sending the instruction to the switch to cause the switch to create the first group entry in a packet processing pipeline of the switch.

A set of one or more non-transitory machine-readable storage media storing instructions which, when executed by one or more processors of one or more network devices implementing a first controller in a software defined networking (SDN) network, causes the one or more network devices to perform operations for programming a switch in the SDN network to use a controller port as a watch port. The operations include generating an instruction for the switch to create a first group entry for a first group in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller port being specified as the watch port in the first bucket indicates that execution of the action specified by the first bucket is to be contingent upon a liveness of the first controller port and sending the instruction to the switch to cause the switch to create the first group entry in a packet processing pipeline of the switch.

A network device configured to implement a first controller in a software defined networking (SDN) network, where the first controller is configured to program a switch in the SDN network to use a controller port as a watch port. The network device includes one or more processors and a non-transitory machine-readable storage medium having instructions stored therein, which when executed by the one or more processors, causes the network device implementing the first controller to generate an instruction for the switch to create a first group entry in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller port being specified as the watch port in the first bucket indicates that execution of the action specified by the first bucket is to be contingent upon a liveness of the first controller port and send the instruction to the switch to cause the switch to create the first group entry in a packet processing pipeline of the switch.

BRIEF DESCRIPTION OF THE DRAWINGS

The invention may best be understood by referring to the following description and accompanying drawings that are used to illustrate embodiments of the invention. In the drawings:

FIG. 6 is a flow diagram of a process by a controller for programming a switch to use a controller port as a watch port, according to some embodiments.

FIG. 7 is a flow diagram of a process by a switch for configuring a controller port as a watch port, according to some embodiments.

DETAILED DESCRIPTION

Figure 1:
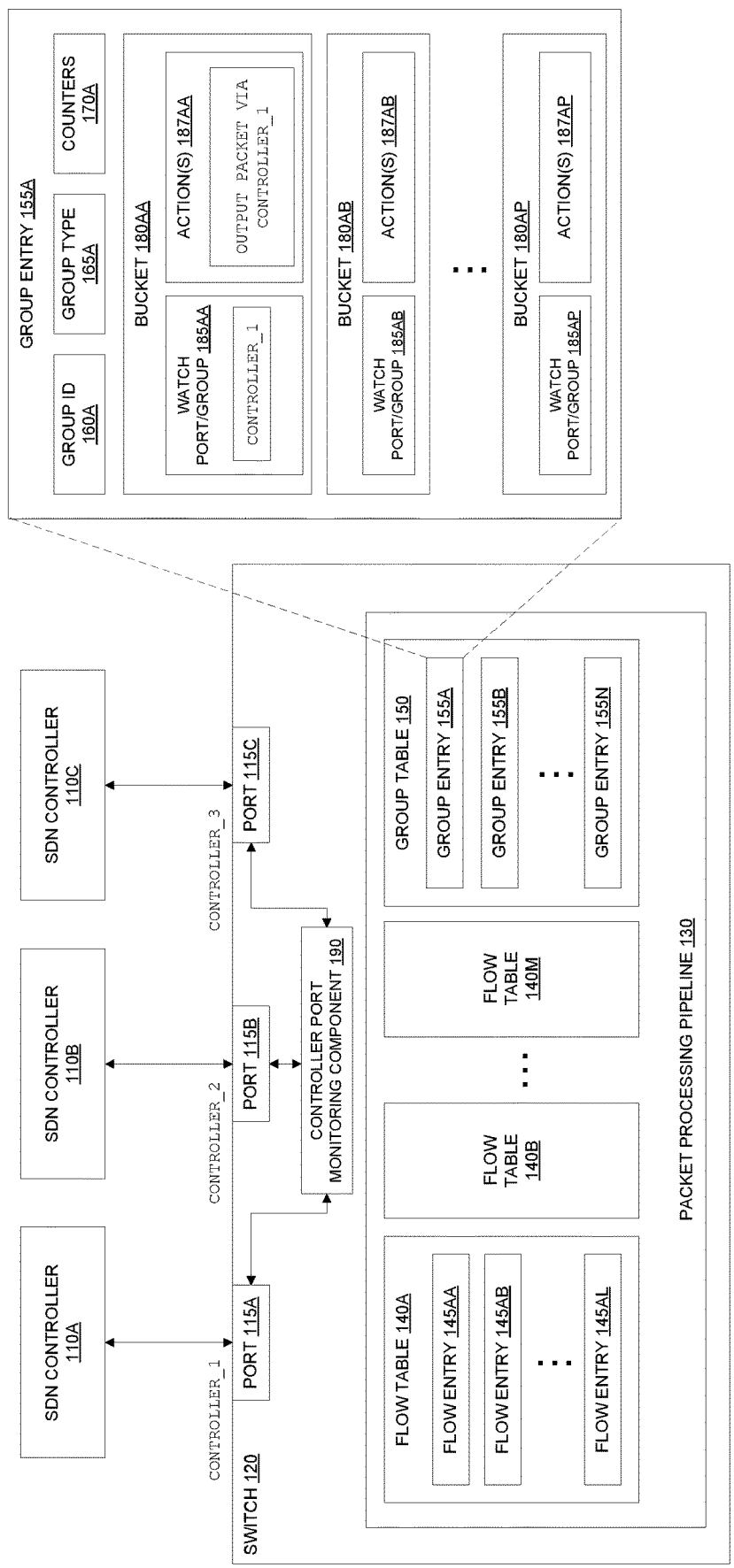
FIG. 1 is a block diagram illustrating a SDN network in which a controller port is used as a watch port, according to some embodiments.

The following description describes methods, systems, and apparatus for using a controller port as a watch port to provide robust operation in a software defined networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, the OpenFlow specification currently does not support liveness flags for reserved ports such as the CONTROLLER reserved port (which is associated with the control channel between the switch and the controller). As such, the CONTROLLER reserved port cannot be configured as a watch port for a bucket. Embodiments disclosed herein allow a controller port to be used as a watch port to provide robust operation in a SDN network. One example embodiment is a method by one or more network devices implementing a first controller in a SDN network. The method includes generating an instruction for the switch to create a first group entry in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller port being specified as the watch port in the first bucket indicates that execution of the action specified by the first bucket is to be contingent upon a liveness of the first controller port. The method further includes sending the instruction to the switch to cause the switch to create the first group entry in a packet processing pipeline of the switch. In response to receiving the instruction from the first controller, the switch may create the group entry in its packet processing pipeline according to the instruction. The switch may then start monitoring the liveness of the first controller port and process packets directed to the first group using the first group.

The ability to specify a controller port as a watch port allows the controller to program switch behavior at a more granular level in cases where the controller port is not live (e.g., due to controller failure or control channel failure) to provide robust SDN operation. There are several use cases where the ability to specify a controller port as a watch port can provide more robust SDN operation. A few exemplary use cases are discussed below. It should be understood that these use cases are provided by way of example and that there can be additional use cases where the ability to specify a controller port as a watch port can provide more robust SDN operation and/or other advantages.

Security Analysis Use Case:

A replication/all group may be used by a switch to send a copy of traffic to the controller to be analyzed for security threats while sending the actual traffic to the intended destination. If the controller determines based on its analysis that the traffic poses a security threat, the controller may program switches to drop the traffic. However, currently, in the case where the control channel (between the switch and the controller) is down, the actual traffic will continue to flow to the destination even though the controller did not receive a copy of the traffic and thus did not have a chance to analyze the traffic for security threats, which may allow malicious traffic to flow to the destination. With the ability to specify a controller port as a watch port, the replication group can be configured so that traffic is only allowed to be sent to the destination when the controller port is live.

Multiple Controller Use Case:

When a switch has multiple control channels/connections (either multiple control channels to different controllers and/or multiple auxiliary connections to a single controller), detecting the control channel/connection failure and redirecting traffic via a different control channel/connection is completely in the switch's control. Currently, the controller is not able to program the switch policy for such decisions. With the ability to specify a controller port as a watch port, a fast failover group or select group can be used with the different controller ports as watch ports so that when a given controller port is not live (e.g., due to controller failure or control channel/connection failure), traffic from the switch can be automatically sent to a different controller or on a different connection.

Address Resolution Protocol (ARP) Use Case:

When a Layer 2 (L2) domain includes a cloud domain and non-cloud domain (e.g., Virtual Enterprise Gateway), it is highly recommended (and sometimes mandatory) to have a controller that performs proxy ARP on behalf of the devices in the non-cloud domain. This is to avoid ARP broadcasts getting into the non-cloud domain since such broadcasts in the non-cloud domain can consume a significant amount of bandwidth/resources, particularly if the non-cloud domain includes Wi-Fi devices or other types of wireless devices. However, if the controller acting as the ARP proxy goes down, then ARP may not work properly in the non-cloud domain. With the ability to specify a controller port as a watch port, a fast failover group can be used to broadcast ARP messages in the non-cloud domain if the controller port is not live. In this case connectivity becomes more important over broadcast optimization.

Redirection Use Case:

When there are multiple paths from a switch to a single controller (e.g., there could be an out-of-band path to the controller via a controller port and an in-band path to the controller via the data plane (e.g., by going through other switches)), detecting the failure of one path and redirecting traffic via another path (e.g., use in-band path when out-of-band path fails) is completely in the switch's control. Currently, the controller is not able to program the switch policy for such decisions. With the ability to specify a controller port as a watch port, a fast failover group can be used to send traffic to the controller via an alternate path (e.g., in-band path) when the primary path (e.g., out-of-band path) fails.

FIG. 1 is a block diagram illustrating a SDN network in which a controller port is used as a watch port, according to some embodiments. As shown in the diagram, the SDN network includes a switch 120 that is communicatively coupled to SDN controllers 110A-C (sometimes referred to simply as "controllers"). The switch 120 includes controller ports 115A-C, a controller port monitoring component 190 for monitoring the liveness of the controller ports 115A-C, and a packet processing pipeline 130.

For purposes of illustration only, the SDN network is shown as including a single switch that is communicatively coupled to three controllers 110. It should be understood, however, that a switch 120 may be communicatively coupled to more or less controllers 110. Also, it should be understood that most implementations will include more than one switch 120. In general, it should be understood that the components and configuration of the components shown in the diagram are an illustrative example and that and that other embodiments may include more or less components that are arranged in a different configuration than shown in the diagram. For purposes of illustration only, embodiments are primarily described herein in an OpenFlow context where the controller 110 and the switch 120 implement OpenFlow. This is by way of example and not intended to be limiting. It should be understood that the techniques and concepts described herein can also be implemented using other types of SDN protocols/implementations.

The controllers 110 are responsible for managing the forwarding behavior of the switch 120 (and potentially other switches in the SDN network—which are not shown). This may involve one or more of the controllers 110 programming the packet processing pipeline 130 of the switch 120 using a southbound protocol such as OpenFlow. Controller port 115A (designated as "CONTROLLER_1") is a port associated with a control channel between the switch 120 and controller 110A, controller port 115B (designated as "CONTROLLER_2") is a port associated with a control channel between the switch 120 and controller 110B, and controller port 115C (designated as "CONTROLLER 3") is a port associated with a control channel between the switch 120 and controller 110C. The switch 120 may forward packets to controllers 110A-C via the respective controller ports 115A-C. As used herein, a control channel refers to a communication channel that is used for sending control information (e.g., for sending OpenFlow Packet-In and/or Packet-Out messages). Each of the controller ports 115 may be a physical port or a logical port. The switch 120 may include additional ports (not shown) which are used for forwarding packets in the data plane (e.g., to other switches 120 in the SDN network).

The controller port monitoring component 190 monitors the liveness of one or more controller ports 115 of the switch 120. In general, a controller port 115 may be considered live if that controller port can be used to reach a controller 110. A controller port 115 may be considered not live if that controller port cannot be used to reach a controller 110 (e.g., due to a controller failure and/or a control channel failure). The controller port monitoring component 190 may monitor the liveness of a controller port 115 using various means. In one embodiment, the controller port monitoring component 190 monitors the liveness of a controller port 115 using an echo request and reply mechanism. For example, in OpenFlow, an Echo Request message consists of an OpenFlow header plus an arbitrary-length data field. The data field might be a message timestamp to check latency, various lengths to measure bandwidth, or zero-size to verify liveness between the switch 120 and controller 110. An Echo Reply message consists of an OpenFlow header plus the unmodified data field of an Echo Request message. Echo Request/Reply messages can be used to derive the liveness of a controller port 115. For example, if the switch 120 does not receive a response to an Echo Request message sent to a controller 110 via a controller port 115 within a specified period of time, the liveness flag for the controller port 115 can be set to false (i.e., not live). In one embodiment, the controller port monitoring component 190 monitors the liveness of a controller port 115 based on monitoring the state of a transmission control protocol (TCP) connection established between the switch and the controller. In one embodiment, the controller port monitoring component 190 monitors the liveness of a controller port 115 using bidirectional forwarding detection (BFD) (if it is supported by the controller 110). In one embodiment, the controller port monitoring component 190 monitors the liveness of a controller port 115 based on detecting whether a user datagram protocol (UDP) connection between the switch 120 and the controller 110 has timed out. In some embodiments, the controller port monitoring component 190 may use a combination of the mechanisms mentioned above to monitor the liveness of a controller port 115. For example, the controller port monitoring component 190 may monitor the liveness of a controller port 115 using an echo request and reply mechanisms and based on monitoring the state of the TCP connection between the switch 120 and the controller 110.

The packet processing pipeline 130 of the switch 120 includes one or more flow tables 140 and a group table 150. In the example shown in the diagram, the packet processing pipeline 130 of the switch 120 includes flow tables 140A-M and group table 150. Each flow table 140 may include one or more flow entries 145. In the example shown in the diagram, flow table 140A is shown as including flow entries 145AA-AL. It should be understood that each of the other flow tables 140B-M may also include one or more flow entries but are not shown to avoid cluttering the diagram. Each flow entry 145 may specify a match condition and a set of instructions. When the switch 120 receives an incoming packet, the switch 120 begins packet processing at the first (foremost) flow table 140 (e.g., table-0 in OpenFlow). The switch 120 matches the packet against flow entries 145 in the first flow table 140 and if the packet matches the match condition specified by a flow entry, the switch 120 executes the corresponding set of instructions specified by that flow entry. As used herein, a packet is said to match a flow entry if the packet matches the match condition specified by that flow entry. The set of instructions specified by a flow entry may include instructions for the switch to perform various operations on a matching packet including, but not limited to, forwarding the packet to a specified port, modifying certain bits in the packet header, encapsulating the packet, dropping the packet, directing the packet to another flow table, and directing the packet to a specified group for group processing. If the packet is directed to another flow table 140, then the switch 120 matches the packet against flow entries 145 in that flow table 140 in a similar manner as described above. The switch 120 may continue processing the packet through the packet processing pipeline 130 in this manner until the packet is forwarded out of the switch 120.

The group table 150 may include one or more group entries 155 that each represent/define a group. In the example shown in the diagram, the group table 150 includes group entries 155A-N. Each group entry 155 may include a group ID field 160 for identifying the group, a group type field 165 for indicating the group type (e.g., select, fast failover, all/replication, etc.), a counters field 170 for maintaining a count of packets processed using the group, and zero or more buckets 180. For example, as shown in the diagram, group entry 155A includes group ID field 160A, group type field 165A, counters field 170A, and buckets 180AA-AP. It should be understood that each of the other group entries 155B-N in the group table 150 may also include such fields but are not shown to avoid cluttering the diagram. Also, it should be understood that group entries 155 can include a different set fields than shown in the diagram.

Each bucket 180 may include a watch port/group field 185 to indicate the watch port/group for the bucket and an action(s) field 187 to indicate the actions associated with the bucket 180. For example, bucket 180AA includes watch port/group field 185AA and action(s) field 187AA. It should be understood that each of the other buckets 180AA-AP may also include such fields but are not shown to avoid cluttering the diagram. The watch port/group for a bucket is the port/group whose liveness controls whether the bucket is a candidate for execution (i.e., whether the action(s) associated with the bucket 180 should be executed). As mentioned above, the OpenFlow specification currently does not support liveness flags for reserved ports such as the CONTROLLER reserved port. As such, the CONTROLLER reserved port cannot be configured as a watch port for a bucket. Embodiments allow configuring a controller port as a watch port for a bucket. For example, as shown in the diagram, controller port 115A (i.e., controller port "CONTROLLER_1") is specified as the watch port in bucket 180AA (of group entry 155A) so that execution of the action(s) specified by the bucket 180AA (in action(s) field 187AA) are contingent upon the liveness of controller port 115A.

The ability to specify a controller port 115 as a watch port allows the controller 110 to program switch behavior at a more granular level in cases where the control channel is down to provide robust SDN operation. There are several use cases where the ability to specify a controller port 115 as a watch port provides more robust SDN operation. A few exemplary use cases are discussed below with reference to FIGS. 2-5. It should be understood that these use cases are provided by way of example and that there can be additional use cases where the ability to specify a controller port 115 as a watch port can provide more robust SDN operation and/or other advantages.

Figure 2:
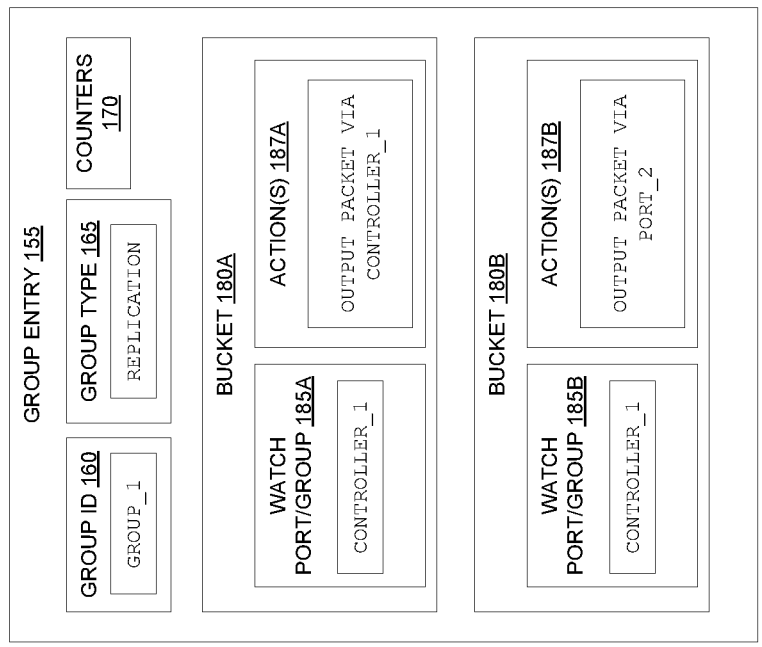
FIG. 2 is a diagram illustrating a group entry that can be used to implement a security analysis use case, according to some embodiments.

FIG. 2 is a diagram illustrating a group entry that can be used to implement a security analysis use case, according to some embodiments. The group ID field 160 of the group entry 155 indicates that the ID for the group is "GROUP_1" and the group type field 165 of the group entry 155 indicates that the group is of a replication group type (execute all buckets in the group). The group entry 155 includes buckets 180A and 180B. Bucket 180A specifies controller port "CONTROLLER_1" as the watch port/group (in watch port/group field 185A) and an action to output packets via controller port "CONTROLLER_1" to controller 110A (in action(s) field 187A). Bucket 180B specifies controller port "CONTROLLER_1" as the watch port/group (in watch port/group field 185B) and an action to output packets via "PORT_2" (in action(s) field 187B), which in this example is a port associated with a path in the data plane.

This group entry 155 may be used by the switch 120 to send a copy of traffic to controller 110A (via controller port "CONTROLLER_1") to be analyzed for security threats while sending the actual traffic to the intended destination (via port "PORT_2"). By specifying controller port "CONTROLLER_1" as the watch port for both buckets 180A and 180B, the action(s) specified by these buckets 180 will only be executed if controller port "CONTROLLER_1" is live (e.g., as determined by the controller port monitoring component 190). Thus, in cases where controller port "CONTROLLER_1" is live, packets will be forwarded to controller 110A and also forwarded to the intended destination. However, in cases where controller port "CONTROLLER_1" is not live, packets will not be forwarded to the intended destination. This provides more robust operation compared to existing group processing mechanisms, as it only allows traffic to flow to the destination when controller 110A is reachable (and thus has a chance to analyze the traffic for security threats).

Figure 3:
FIG. 3 is a diagram illustrating a group entry that can be used to implement a multiple controller use case, according to some embodiments.

FIG. 3 is a diagram illustrating a group entry that can be used to implement a multiple controller use case, according to some embodiments. The group ID field 160 of the group entry 155 indicates that the ID for the group is "GROUP 2" and the group type field 165 of the group entry 155 indicates that the group is of a select group type (execute one selected bucket in the group that is live) or fast failover (FFO) group type (execute the first live bucket in the group). The group entry 155 includes buckets 180A, 180B, and 180C. Bucket 180A specifies controller port "CONTROLLER_1" as the watch port/group (in watch port/group field 185A) and an action to output packets via controller port "CONTROLLER_1" to controller 110A (in action(s) field 187A). Bucket 180B specifies controller port "CONTROLLER 2" as the watch port/group (in watch port/group field 185B) and an action to output packets via controller port "CONTROLLER_2" to controller 110B (in action(s) field 187B). Bucket 180C specifies controller port "CONTROLLER 3" as the watch port/group (in watch port/group field 185C) and an action to output packets via controller port "CONTROLLER 3" to controller 110C (in action(s) field 187C).

This group entry 155 may be used by the switch 120 to forward packets via one of the controller ports 115 that is live. If the group type is a select group type then the packet is forwarded to one of the controller ports 115 that is live based on a switch-computed selection algorithm (e.g., round robin). If the group type is a fast failover group type then packets are forwarded via the first defined controller port that is live. For example, if controller port "CONTROLLER_1" is live then the packets are forwarded via this controller port 115A to controller 110A. However, if controller port "CONTROLLER_1" is not live but controller port "CONTROLLER_2" is live, then packets are forwarded via this controller port 115B to controller 110B. If both controller port "CONTROLLER_1" and controller port "CONTROLLER_2" are not live but controller port "CONTROLLER_3" is live, then packets are forwarded via this controller port 115C to controller 110C. This provides more robust operation compared to existing group processing mechanisms, as it allows a controller 110 to program the switch policy on how to handle controller failures and/or control channel failures. While the group entry 155 shown in the diagram is for a multiple controller use case with three controllers 110, it should be understood that the group entry 155 can be configured for a use case with a different number of controllers 110 (e.g., more than three controllers 110).

Figure 4:
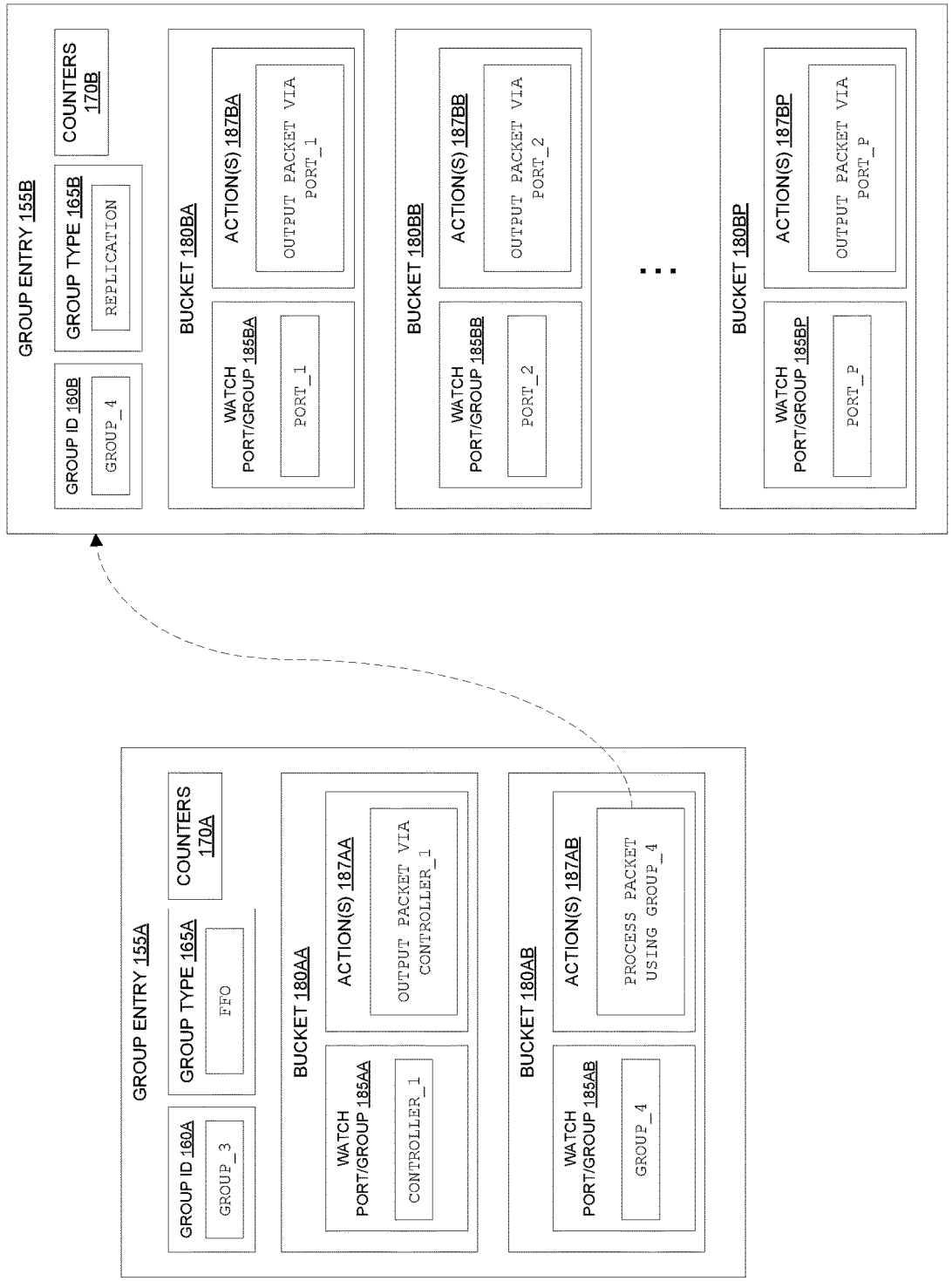
FIG. 4 is a diagram illustrating group entries that can be used to implement an ARP use case, according to some embodiments.

FIG. 4 is a diagram illustrating group entries that can be used to implement an ARP use case, according to some embodiments. Two group entries are shown in the diagram: group entry 155A and group entry 155B. With regard to group entry 155A, the group ID field 160A of this group entry 155A indicates that the ID for the group is "GROUP_3" and the group type field 165 of this group entry 155A indicates that the group is of a fast failover (FFO) group type (execute the first live bucket in the group). Group entry 155A includes buckets 180AA and 180AB. Bucket 180AA specifies controller port "CONTROLLER_1" as the watch port/group (in watch port/group field 185AA) and an action to output packets via this controller port 115A to controller 110A (in action(s) field 187AA). Bucket 180AB specifies group "GROUP_4" as the watch port/group (in watch port/group field 185AB) and an action to process packets using group "GROUP_4" (in action(s) field 187AB), which refers to the group defined by group entry 155B, as represented in the diagram by the dashed arrow.

With regard to group entry 155B, the group ID field 160B of this group entry 155B indicates that the ID for the group is "GROUP_4" and the group type field 165 of this group entry 155 indicates that the group is of a replication/all group type (execute all buckets in the group). Group entry 155B includes buckets 180BA-180BP. Bucket 180BA specifies port "PORT_1" as the watch port/group (in watch port/group field 185BA) and an action to output packets via this port (in action(s) field 187BA), bucket 180BB specifies port "PORT_2" as the watch port/group (in watch port/group field 185BB) and an action to output packets via this port (in action(s) field 187BB), and so on. Bucket 180BP specifies port "PORT P" as the watch port/group (in watch port/group field 185BP) and an action to output packets via this port (in action(s) field 187BP).

Group entry 155A and group entry 155B may be used by the switch 120 to send ARP messages via controller port "CONTROLLER_1" to controller 110A (e.g., which may be acting as an ARP proxy) when controller port 115A is live but to broadcast ARP messages (e.g., into a non-cloud domain served by the ARP proxy) using group "GROUP_4" when controller port 115A is not live. This provides more robust operation compared to existing group processing mechanisms, as it may allow, for example, a non-cloud domain served by the controller 110 acting as an ARP proxy to receive ARP broadcasts when the controller 110 goes down.

Figure 5:
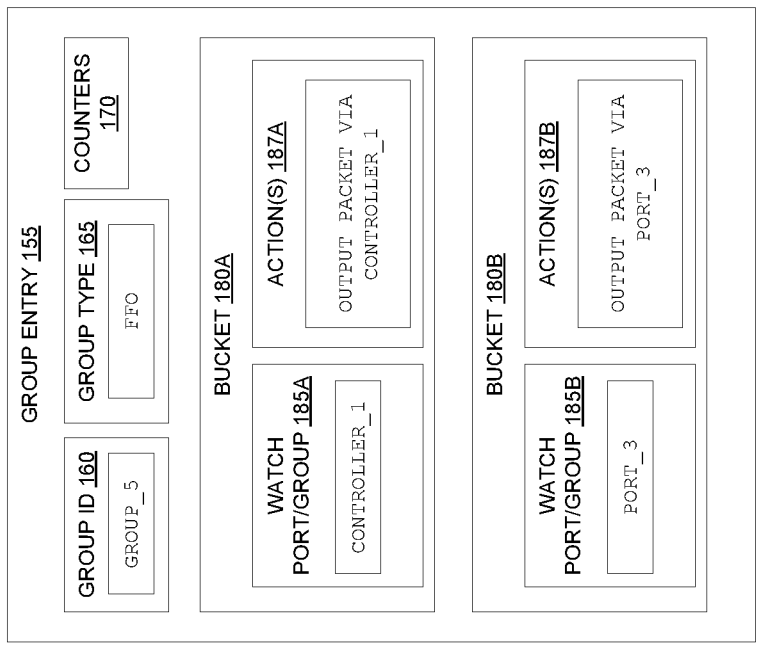
FIG. 5 is a diagram illustrating a group entry that can be used to implement a redirection use case, according to some embodiments.

FIG. 5 is a diagram illustrating a group entry that can be used to implement a redirection use case, according to some embodiments. The group ID field 160 of the group entry 155 indicates that the ID for the group is "GROUP_5" and the group type field 165 of the group entry 155 indicates that the group is of a fast failover group type (execute the first live bucket in the group). The group entry 155 includes buckets 180A and 180B. Bucket 180A specifies controller port "CONTROLLER_1" as the watch port/group (in watch port/group field 185A) and an action to output packets via this controller port 115A to controller 110A (e.g., via an out-of-band path). Bucket 180B specifies port "PORT_3" as the watch port/group (in watch port/group 185B) and an action to output packets via port "PORT_3" (in action(s) field 187B), where this port is associated with an in-band communication path to controller 110A (e.g., via other switches 120 in the SDN network).

This group entry 155 may be used by the switch 120 to forward packets via controller port "CONTROLLER_1" when this controller port 115A is live but to forward packets via port "PORT_3" when controller port "CONTROLLER_1" is not live. This provides more robust operation compared to existing group processing mechanisms, as it allows a controller 110 to program the switch policy on how to handle controller failures and/or control channel failures.

FIG. 6 is a flow diagram of a process by a controller for programming a switch to use a controller port as a watch port, according to some embodiments. In one embodiment, the process is implemented by one or more network devices implementing a first controller in a SDN network, where the first controller is communicatively coupled to a switch. The operations in the flow diagrams will be described with reference to the exemplary embodiments of the other figures. However, it should be understood that the operations of the flow diagrams can be performed by embodiments other than those discussed with reference to the other figures, and embodiments discussed with reference to these other figures can perform operations different than those discussed with reference to the flow diagrams.

At block 610, the first controller generates an instruction for the switch to create a first group entry in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller being specified as the watch port in the first bucket indicates that execution of the action specified by the first bucket is to be contingent upon a liveness of the first controller port.

The first group entry may be configured to provide robust operation in the SDN network for various use cases. Block 615A describes a configuration for a security analysis use case. In this use case, the first group entry may further include a second bucket that specifies the first controller port as a watch port and an action for the switch to forward packets via a specified port, where the first group is of a replication group type. The first group may be used by the switch to process packets that are to be analyzed by the first controller for security threats, as described above.

Block 615B describes a multiple controller use case. In this use case, the first group entry may further include a second bucket that specifies a second controller port as a watch port and an action for the switch to forward packets to a second controller that is different from the first controller via the second controller port, where the second controller port is a port that is associated with a control channel between the switch and the second controller, where the first group is of a select group type or a fast failover group type.

Block 615C describes a configuration for an ARP use case. In this use case, the first group entry further includes a second bucket that specifies a second group as a watch group and an action for the switch to process packets using the second group (which may be defined by a second group entry), where the first group entry is of a fast failover group type, where the second group is of a replication group type. The first group and the second group may be used by the switch to broadcast ARP packets (e.g., into a non-cloud domain) when the first controller port is not live, as described above.

Block 615D describes a configuration for a redirection use case. In this use case, the first group entry further includes a second bucket that specifies a port as a watch port and an action for the switch to forward packets to the first controller via the port, where the port is associated with an in-band communication channel between the switch and the first controller, where the first group is of a fast failover group type.

At block 620, the first controller sends the instruction to the switch to cause the switch to create the first group entry in a packet processing pipeline of the switch. In one embodiment, the first controller sending the instructions to the switch causes the switch to monitor the liveness of the first controller port. In one embodiment, the switch monitors the liveness of the first controller port using an echo request and reply mechanism. Additionally or alternatively (to using the echo request and reply mechanism), in one embodiment, the switch monitors the liveness of the first controller port based on monitoring the state of a TCP connection established between the switch and the first controller. In one embodiment, the switch monitors the liveness of the first controller port using BFD. In one embodiment, the switch monitors the liveness of the first controller port based on detecting whether a UDP connection established between the switch and the first controller has timed out.

FIG. 7 is a flow diagram of a process by a switch for configuring a controller port as a watch port, according to some embodiments. In one embodiment, the process is implemented by one or more network devices implementing a switch in a SDN network, where the first switch is communicatively coupled to a first controller.

At block 710, the switch receives, from the first controller, an instruction for the switch to create a first group entry in a packet processing pipeline of the switch, where the first group entry includes a first bucket that specifies a first controller port as a watch port and an action for the switch to forward packets to the first controller via the first controller port, where the first controller port is a port that is associated with a control channel between the switch and the first controller, where the first controller being specified as the watch port in the first bucket indicates that execution of the action specified by the first bucket is to be contingent upon a liveness of the first controller port.

The first group entry may be configured to provide robust operation in the SDN network for various use cases. Block 715A describes a configuration for a security analysis use case. In this use case, the first group entry may further include a second bucket that specifies the first controller port as a watch port and an action for the switch to forward packets via a specified port, where the first group is of a replication group type. The first group may be used by the switch to process packets that are to be analyzed by the first controller for security threats, as described above.

Block 715B describes a configuration for a multiple controller use case. In this use case, the first group entry may further include a second bucket that specifies a second controller port as a watch port and an action for the switch to forward packets to a second controller that is different from the first controller via the second controller port, where the second controller port is a port that is associated with a control channel between the switch and the second controller, where the first group is of a select group type or a fast failover group type.

Block 715C describes a configuration for an ARP use case. In this use case, the first group entry further includes a second bucket that specifies a second group as a watch group and an action for the switch to process packets using the second group (which may be defined by a second group entry), where the first group entry is of a fast failover group type, where the second group is of a replication group type. The first group and the second group may be used by the switch to broadcast ARP packets (e.g., into a non-cloud domain) when the first controller port is not live, as described above.

Block 715D describes a configuration for a redirection use case. In this use case, the first group entry further includes a second bucket that specifies a port as a watch port and an action for the switch to forward packets to the first controller via the port, where the port is associated with an in-band communication channel between the switch and the first controller, where the first group is of a fast failover group type.

At block 720, the switch creates the first group entry in the packet processing pipeline of the switch according to the instruction received from the first controller.

At block 730, the switch monitors the liveness of the first controller port (and possibly other controller ports that are specified as watch ports). In one embodiment, the switch monitors the liveness of the first controller port using an echo request and reply mechanism. Additionally or alternatively (to using the echo request and reply mechanism), in one embodiment, the switch monitors the liveness of the first controller port based on monitoring the state of a TCP connection established between the switch and the first controller. In one embodiment, the switch monitors the liveness of the first controller port using BFD. In one embodiment, the switch monitors the liveness of the first controller port based on detecting whether a UDP connection established between the switch and the first controller has timed out.

At block 740, the switch processes packets directed to the first group using the first group.

Figure 8A:
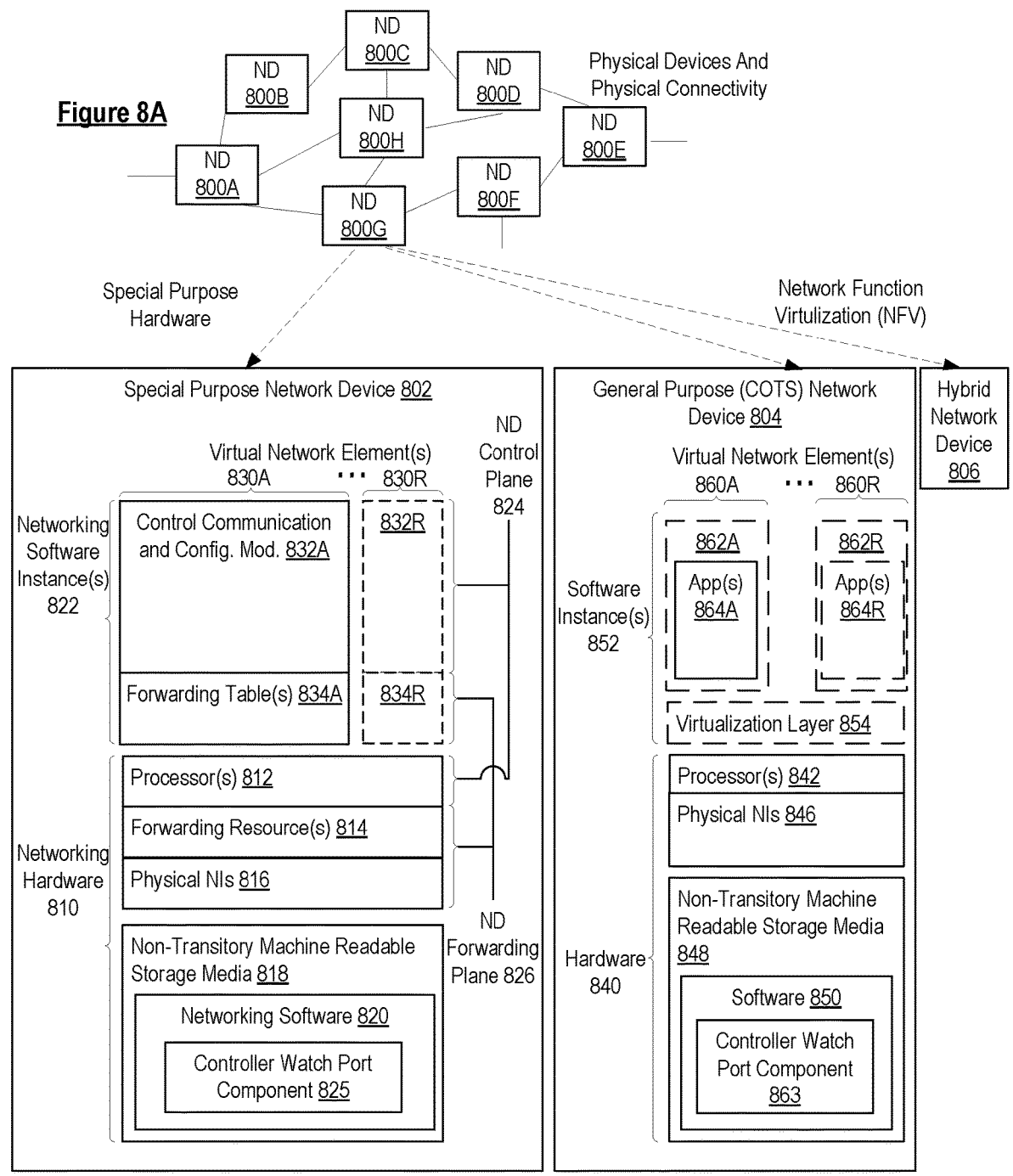
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application—specific integrated—circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as controller watch port component 825, which when executed by networking hardware 810, causes the special-purpose network device 802 to perform operations of one or more embodiments described herein above as part networking software instances 822 (e.g., to use a controller port as a watch port).

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
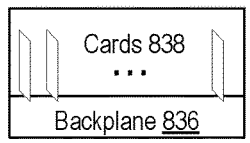
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as controller watch port component 863, which when executed by processor(s) 842, cause the general purpose network device 804 to perform operations of one or more embodiments described herein above as part software instances 862A-R (e.g., to use a controller port as a watch port).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
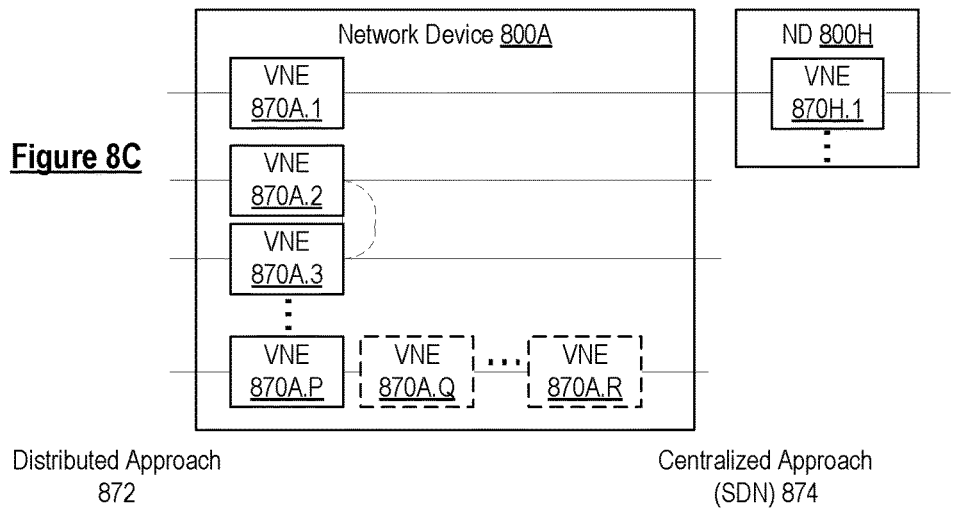
FIG. 8C illustrates various exemplary ways in which virtual network elements (VNEs) may be coupled according to some embodiments.

FIG. 8C illustrates various exemplary ways in which VNEs may be coupled according to some embodiments. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
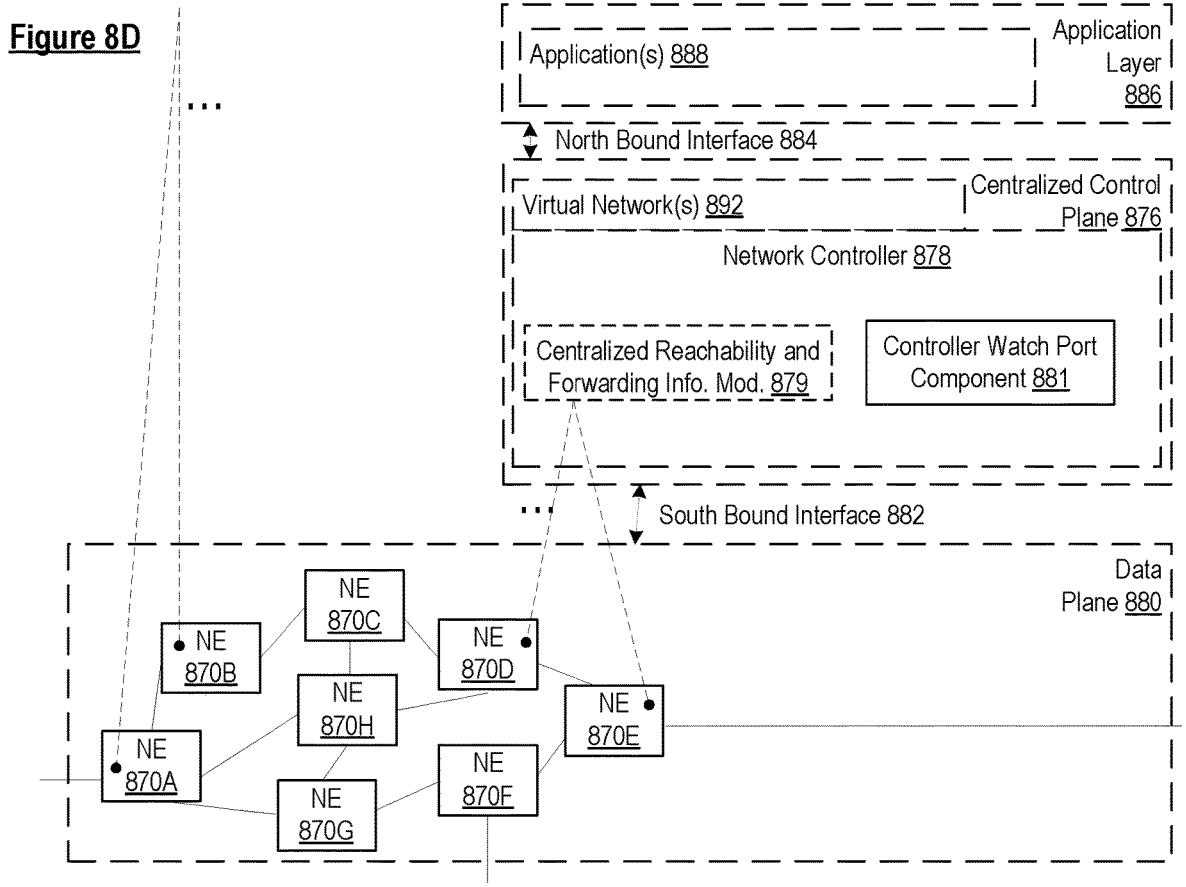
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized MultiProtocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

In one embodiment, the network controller 878 may include a controller watch port component 881 that when executed by the network controller 878, causes the network controller 878 to perform operations of one or more embodiments described herein above (e.g., to program a switch to use a controller port as a watch port).

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
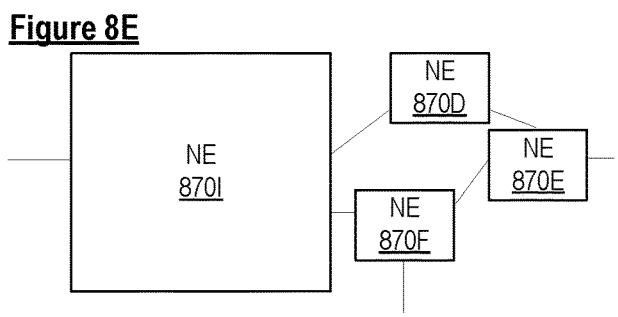
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
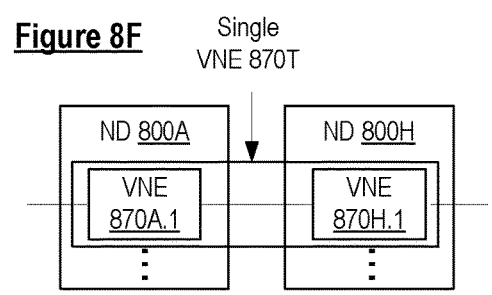
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments. Thus, the abstraction of a NE or VNE can span multiple NDs.

While some embodiments implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
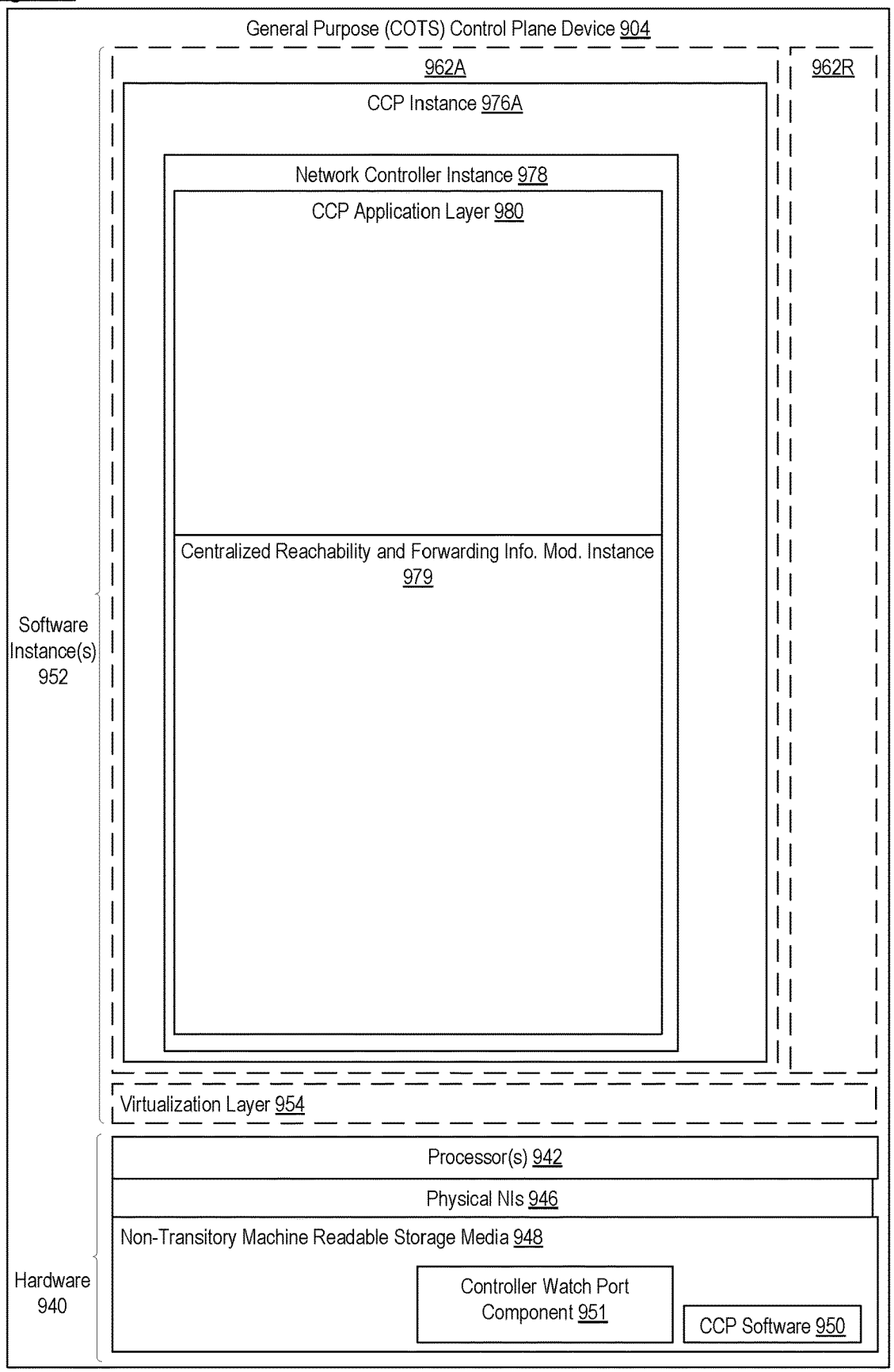
FIG. 9 illustrates a general purpose control plane device with centralized control plane (CCP) software, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and physical NIs 946, as well as non-transitory machine readable storage media 948 having stored therein centralized control plane (CCP) software 950 and a controller watch port component 9751.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The controller watch port component 951 can be executed by hardware 940 to perform operations of one or more embodiments described herein above as part of software instances 952 (e.g., to program a switch to use a controller port as a watch port).

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by one or more network devices implementing a first controller in a software defined networking (SDN) network for programming a switch in the SDN network to use a controller port as a watch port, the method comprising:
    generating an instruction for the switch to create a first group entry for a first group in a packet processing pipeline of the switch, wherein the first group entry includes a first bucket that specifies a first controller port as a watch port and an action for the switch to forward packets to the first controller via the first controller port wherein the first controller port is a port that is associated with a control channel between the switch and the first controller and wherein the first controller port being specified as the watch port in the first bucket indicates that execution of the action specified by the first bucket is to be contingent upon a liveness of the first controller port; and further wherein the first group entry includes a second bucket that also specifies the first controller port as a watch port and an action for the switch to forward packets via a specified port, wherein the first controller port being specified as the watch port in the second bucket also indicates that execution of the action specified by the second bucket is to be contingent upon the liveness of the first controller port, wherein the first group is of a replication group type, wherein the replication group type is a type of group for which all buckets in the group are to be executed and sending the instruction to the switch to cause the switch to create the first group entry in a packet processing pipeline of the switch.

2. The method of claim 1, wherein the first group is used by the switch to process packets that are to be analyzed by the first controller for security threats.

3. A method by one or more network devices implementing a first controller in a software defined networking (SDN) network for programming a switch in the SDN network to use a controller port as a watch port, the method comprising:

generating an instruction for the switch to create a first group entry for a first group in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port;

wherein the first group entry further includes a second bucket that specifies a second controller port as a watch port and an action for the switch to forward packets to a second controller that is different from the first controller via the second controller port, wherein the second controller port is a port that is associated with a control channel between the switch and the second controller, wherein the second controller port being specified as the watch port in the second bucket indicates that execution of the action specified by the second bucket is to be contingent upon a liveness of the second controller port, wherein the first group is of a select group type or a fast failover group type, wherein the select group type is a type of group for which one live bucket in the group is selected to be executed, wherein the fast failover group type is a type of group for which the first live bucket in the group is to be executed; and sending the instruction to the switch to cause the switch to create the first group entry in a packet processing pipeline of the switch.

4. A method by one or more network devices implementing a first controller in a software defined networking (SDN) network for programming a switch in the SDN network to use a controller port as a watch port, the method comprising:

generating an instruction for the switch to create a first group entry for a first group in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port;

wherein the first group entry further includes a second bucket that specifies a second group as a watch group and an action for the switch to process packets using the second group, wherein the second group being specified as the watch group in the second bucket indicates that execution of the action specified by the second bucket is to be contingent upon the liveness of the second group, wherein the first group is of a fast failover group type, wherein the fast failover group type is a type of group for which the first live bucket in the group is to be executed, wherein the second group is of a replication group type, wherein the replication group type is a type of group for which all buckets in the group are to be executed; and sending the instruction to the switch to cause the switch to create the first group entry in a packet processing pipeline of the switch.

5. The method of claim 4, wherein the first group and the second group are used by the switch to broadcast Address Resolution Protocol (ARP) packets when the first controller port is not live.

6. A set of one or more non-transitory machine-readable storage media storing instructions which, when executed by one or more processors of one or more network devices implementing a first controller in a software defined networking (SDN) network, causes the one or more network devices to perform operations for programming a switch in the SDN network to use a controller port as a watch port, the operations comprising:

generating an instruction for the switch to create a first group entry in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port; wherein the first group entry further includes a second bucket that specifies the first controller port as a watch port and an action for the switch to forward packets via a specified port, wherein the first controller port being specified as the watch port in the second bucket indicates that execution of the action specified by the second bucket is to be contingent upon the liveness of the first controller port, wherein the first group is of a replication group type, wherein the replication group type is a type of group for which all buckets in the group are to be executed; and sending the instruction to the switch to cause the switch to create the first group entry in a packet processing pipeline of the switch.

7. A set of one or more non-transitory machine-readable storage media storing instructions which, when executed by one or more processors of one or more network devices implementing a first controller in a software defined networking (SDN) network, causes the one or more network devices to perform operations for programming a switch in the SDN network to use a controller port as a watch port, the operations comprising:

generating an instruction for the switch to create a first group entry in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port; wherein the first group entry further includes a second bucket that specifies a second controller port as a watch port and an action for the switch to forward packets to a second controller that is different from the first controller via the second controller port, wherein the second controller port is a port that is associated with a control channel between the switch and the second controller, wherein the second controller port being specified as the watch port in the second bucket indicates that execution of the action specified by the second bucket is to be contingent upon a liveness of the second controller port, wherein the first group is of a select group type or a fast failover group type, wherein the select group type is a type of group for which one live bucket in the group is selected to be executed, wherein the fast failover group type is a type of group for which the first live bucket in the group is to be executed; and sending the instruction to the switch to cause the switch to create the first group entry in a packet processing pipeline of the switch.

8. A set of one or more non-transitory machine-readable storage media storing instructions which, when executed by one or more processors of one or more network devices implementing a first controller in a software defined networking (SDN) network, causes the one or more network devices to perform operations for programming a switch in the SDN network to use a controller port as a watch port, the operations comprising:

generating an instruction for the switch to create a first group entry in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port; wherein the first group entry further includes a second bucket that specifies a second group as a watch group and an action for the switch to process packets using the second group, wherein the second group being specified as the watch group in the second bucket indicates that execution of the action specified by the second bucket is to be contingent upon the liveness of the second group, wherein the first group is of a fast failover group type, wherein the fast failover group type is a type of group for which the first live bucket in the group is to be executed, wherein the second group is of a replication group type, wherein the replication group type is a type of group for which all buckets in the group are to be executed; and sending the instruction to the switch to cause the switch to create the first group entry in a packet processing pipeline of the switch.

9. A network device configured to implement a first controller in a software defined networking (SDN) network, wherein the first controller is configured to program a switch in the SDN network to use a controller port as a watch port, the network device comprising:

one or more processors; and
a non-transitory machine-readable storage medium having instructions stored therein, which when executed by the one or more processors, causes the network device implementing the first controller to:
generate an instruction for the switch to create a first group entry in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port;
wherein the first group entry further includes a second bucket that specifies the first controller port as a watch port and an action for the switch to forward packets via a specified port, wherein the first controller port being specified as the watch port in the second bucket indicates that execution of the action specified by the second bucket is to be contingent upon the liveness of the first controller port, wherein the first group is of a replication group type, wherein the replication group type is a type of group for which all buckets in the group are to be executed; and
send the instruction to the switch to cause the switch to create the first group entry in a packet processing pipeline of the switch.

10. A network device configured to implement a first controller in a software defined networking (SDN) network, wherein the first controller is configured to program a switch in the SDN network to use a controller port as a watch port, the network device comprising:

one or more processors; and
a non-transitory machine-readable storage medium having instructions stored therein, which when executed by the one or more processors, causes the network device implementing the first controller to:
generate an instruction for the switch to create a first group entry in a packet processing pipeline of the switch, wherein the first group entry includes a first bucket that specifies a first controller port as a watch port and an action for the switch to forward packets to the first controller via the first controller port, wherein the first controller port is a port that is associated with a control channel between the switch and the first controller, wherein the first controller port being specified as the watch port in the first bucket indicates that execution of the action specified by the first bucket is to be contingent upon a liveness of the first controller port;

wherein the first group entry further includes a second bucket that specifies a second controller port as a watch port and an action for the switch to forward packets to a second controller that is different from the first controller via the second controller port, wherein the second controller port is a port that is associated with a control channel between the switch and the second controller, wherein the second controller port being specified as the watch port in the second bucket indicates that execution of the action specified by the second bucket is to be contingent upon a liveness of the second controller port, wherein the first group is of a select group type or a fast failover group type, wherein the select group type is a type of group for which one live bucket in the group is selected to be executed, wherein the fast failover group type is a type of group for which the first live bucket in the group is to be executed; and send the instruction to the switch to cause the switch to create the first group entry in a packet processing pipeline of the switch.

* * * * *